(12) United States Patent
Wilson et al.

(10) Patent No.: US 7,382,288 B1
(45) Date of Patent: Jun. 3, 2008

(54) DISPLAY OF AIRPORT SIGNS ON HEAD-UP DISPLAY

(75) Inventors: John G. Wilson, West Linn, OR (US); Kenneth A. Zimmerman, Portland, OR (US); Gary C. Bailey, Beaverton, OR (US); Robert A. Armstrong, Canby, OR (US); Louis J. Bailey, Sherwood, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 646 days.

(21) Appl. No.: 10/883,628

(22) Filed: Jun. 30, 2004

(51) Int. Cl.
*G01C 21/00* (2006.01)
(52) U.S. Cl. .................... 340/972; 340/961; 701/14
(58) Field of Classification Search ............. 340/980, 340/945, 959, 961, 971, 963, 972, 973; 701/3, 701/8, 9, 14, 15, 16; 73/178 T
See application file for complete search history.

(56) References Cited

U.S. PATENT DOCUMENTS

| | | | | |
|---|---|---|---|---|
| 3,706,969 | A * | 12/1972 | Paredes | ...................... 340/989 |
| 5,574,648 | A * | 11/1996 | Pilley | .......................... 701/120 |
| 6,282,488 | B1 * | 8/2001 | Castor et al. | ................ 701/120 |
| 6,571,166 | B1 * | 5/2003 | Johnson et al. | ............. 701/120 |
| 6,731,226 | B2 * | 5/2004 | Walter | ......................... 340/972 |
| 6,862,519 | B2 * | 3/2005 | Walter | ......................... 701/120 |
| 7,155,339 | B2 * | 12/2006 | Tu | ................................ 701/209 |
| 7,194,342 | B1 * | 3/2007 | Horvath et al. | ................ 701/3 |
| 2002/0138200 | A1 * | 9/2002 | Gutierrez | ..................... 701/301 |
| 2003/0009278 | A1 * | 1/2003 | Mallet et al. | ................ 701/120 |
| 2003/0105581 | A1 * | 6/2003 | Walter | ......................... 701/120 |

* cited by examiner

*Primary Examiner*—Brent A. Swarthout
(74) *Attorney, Agent, or Firm*—Nathan O. Jensen; Kyle Eppele

(57) ABSTRACT

A head-up display (HUD) is disclosed. The HUD is provided on board an aircraft. The HUD comprises a projector and a combiner. The combiner enables viewing of the world outside of the combiner and also allows viewing of information provided from the projector. A computer is coupled to the projector and provides airport runway and taxiway symbols conformally mapped onto the combiner. Also provided on the combiner is a mapping of virtual airport signs onto the combiner.

19 Claims, 3 Drawing Sheets

DISPLAY OF AIRPORT SIGNS ON HEAD-UP DISPLAY

CROSS-REFERENCE TO RELATED PATENT APPLICATIONS

This application relates to U.S. patent application Ser. No. 10/883,587 entitled "DISPLAY OF HOLD LINES ON HEAD-UP DISPLAY" and also U.S. patent application Ser. No. 10/883,627 entitled "DISPLAY OF AUTOMATIC DEPENDENT SURVEILLANCE (ADS-B) INFORMATION ON HEAD-UP DISPLAY", which are both filed on the same day herewith.

BACKGROUND

Head-up displays (HUD) and head-up guidance systems (HGS) have been used effectively for aircraft pilots and in other vehicles as an aid to provide information to the pilot or vehicle controller while not requiring the pilot to take his eyes off the outside environment. Further, head-up displays have been used to augment and enhance the outside environment by placing conformal information on the head-up display.

Head-up displays have been widely used in aircraft landing systems, flight guidance systems, and the like. However, little application of surface guidance systems has been applied to the HUD. Accordingly, there is a need for information having to do with surface guidance systems such as that which would be used during taxiing, takeoff, and landing rollout, to be provided on the HUD. Further, there is a need for conformal ground guidance system information to be provided on the HUD as well as non-conformal and/or plan form information to be provided on the HUD such that the pilot is not required to look at a different display for the plan or overhead view information.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

What is provided is a head-up display (HUD). The HUD is on board an aircraft. The HUD comprises a projector. The HUD also comprises a combiner. The combiner enables viewing of the world outside of the combiner and allows viewing of information provided from the projector. Further, the HUD comprises a computer coupled to the projector in providing airport runway and taxi way symbols conformally mapped onto the combiner. A conformal mapping of virtual airport signs is also provided on the combiner.

What is also provided is a method of providing virtual airport signs on an aircraft for a head-up display (HUD). The method comprises determining the location of the aircraft. The method also comprises retrieving geolocated information from a database relating to location of airport features within a predetermined distance of the aircraft. The airport features comprise locations of airport signs. The method further comprises conformally mapping the virtual airport signs onto a combiner of the HUD.

Further, what is provide is a system for projecting virtual airport signs on a combiner of a head-up display (HUD). The system comprises a means for determining the location of the aircraft. The system also comprises a means for retrieving GEO located information from a database relating to location of airport features within a predetermined distance of the aircraft. The airport features comprise locations of airport signs. Further, the system comprises a means for conformally mapping the virtual airport signs onto a combiner of the HUD.

Alternative examples of other exemplary embodiments are also provided which relate to other features and combinations of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF PREFERRED AND EXEMPLARY EMBODIMENTS

Figure 1:
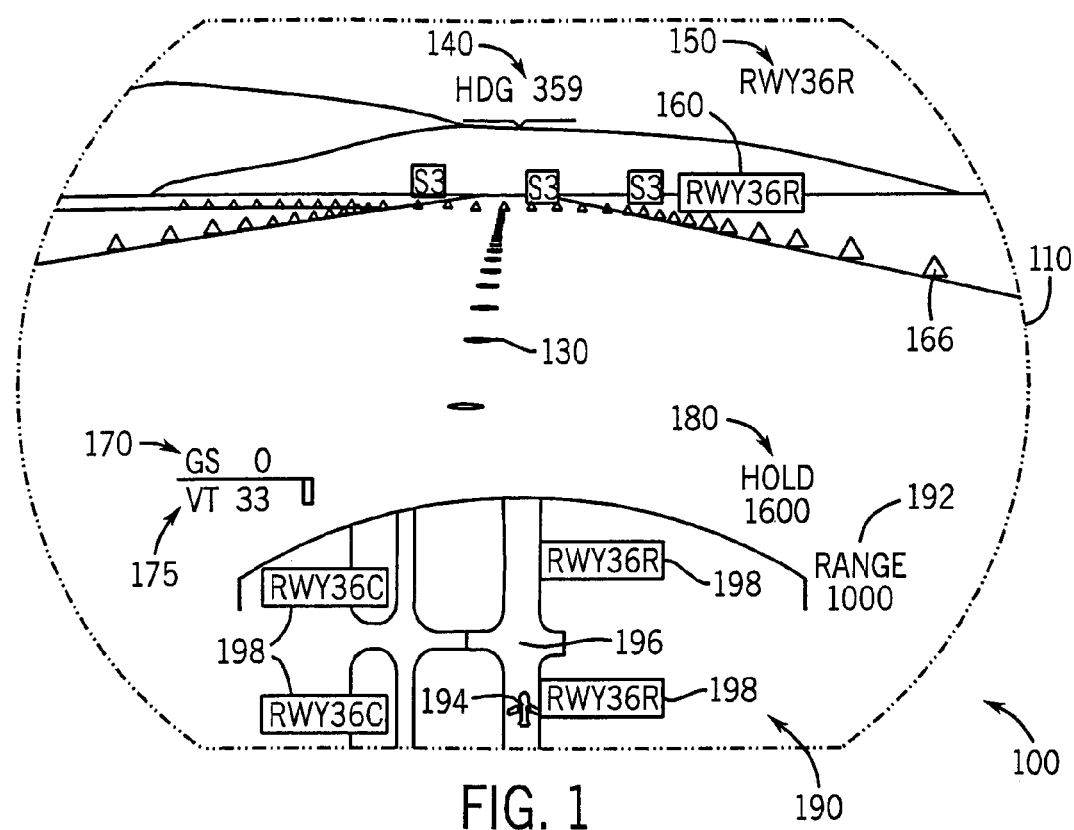
FIG. 1 is an exemplary embodiment of a head-up display providing enhanced information for a surface guidance system (SGS)

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiment depicted in the exemplary diagrams, but should be construed in accordance with the language in the claims.

Referring now to FIG. 1, a view 100 out of a cockpit window is depicted, within view 100 is depicted a combiner 110 for a head-up display. Combiner 110 has conformally displayed thereon information pertaining to the boundaries and other features of the airport runway and taxiways. For example, the outside boundaries are depicted as triangular icons 120. The center of the runway or taxiway is depicted as triangles 130 which are oriented differently than triangles 120. Heading information 140 is provided. The runway 150 on which the aircraft is traveling is also provided. The information such as triangles 120 and triangles 130 are conformally mapped on the display such that they line up closely with the actual outside view. In other exemplary embodiments, the symbology used and location and appearance of information on the combiner may differ without departing from the scope of the invention.

In a particular exemplary embodiment, airport signs, such as runway airport sign 160 are provided. These runway signs are conformally mapped to the actual runway signs found at the location in the pilot's view. The mapping is created by locating the aircraft, via GPS or other location means, a database is referenced to determine the location of particular signs within the pilot's view and the location of the sign is mapped thereon. The text of the sign is enhanced such that it may be readable by a pilot even prior to when the actual text of the sign may be readable to the pilot. Further, an advantage of the present system is that airport signs may potentially be obscured from view by blowing snow, ice, fog, or other conditions. Having the signs provided conformally on the head-up and having the text provided therewith makes it easy for the pilot to read the sign in an appropriate amount of time and further to locate the actual sign should it be obscured from view.

Also provided on a display is a ground speed indicator 170 and a turn velocity indicator 175. The ground speed indicator 170 provides the ground speed of the aircraft and the turn velocity indicator provides the maximum velocity the aircraft should be moving to negotiate the next turn. Further, a hold indicator 180 is provided. Hold indicator 180 provides the distance to the next hold line. Hold lines are painted lines on the airport runway or taxiway in which an aircraft should stop under certain conditions or when directed to do so by an aircraft controller.

These hold lines, as discussed later, may also be conformally mapped on the combiner, at specific times. In the exemplary embodiment depicted, a lower region of the head-up display, a plan form view or non-conformal view 190 is depicted. Plan form view 190 is a view of the aircraft and runway from a range 192 of a thousand feet above the aircraft. The aircraft 194 is depicted at its location on the runway 196. Further, runway signs 198 are provided in their relative geographic location on the map display. Conventionally, this information would be provided on an alternative display which was not a head-up display and therefore adding such information here to the head-up display provides further usability to the pilot such that the pilot does not have to look at both a conformal display on the head-up display and a non-conformal display which is displayed on a head-down display.

Figure 2:
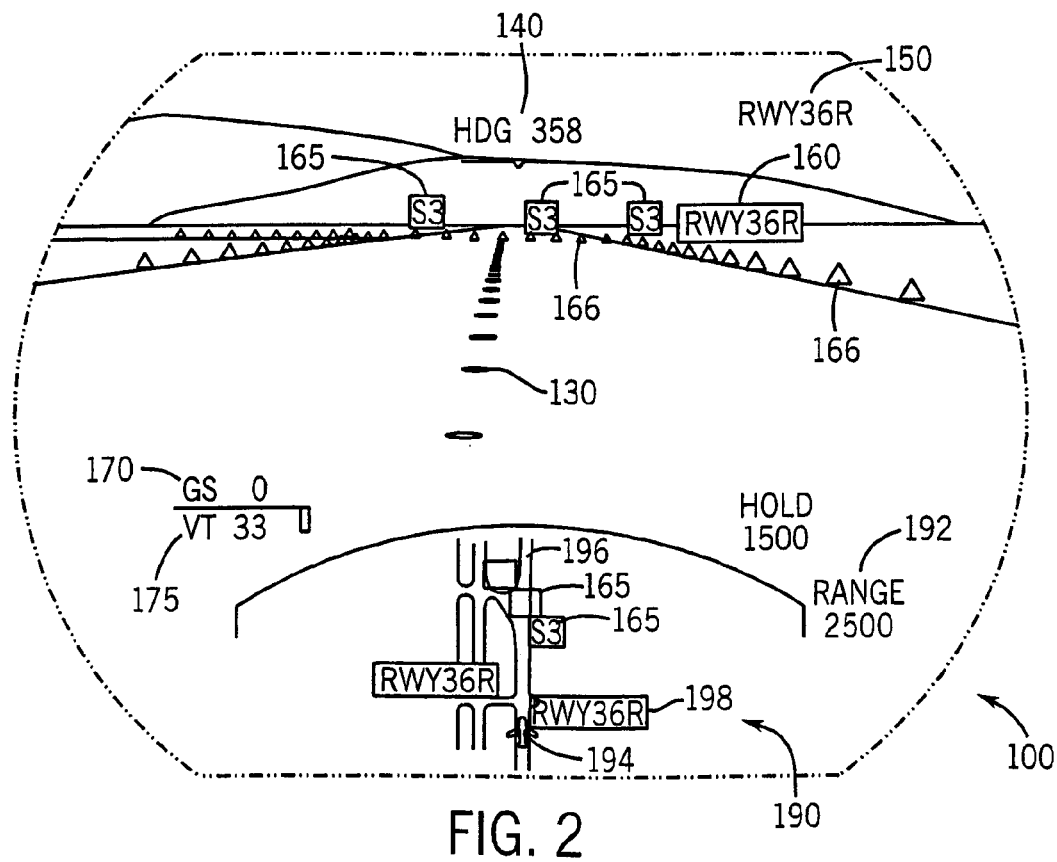
FIG. 2 is another exemplary embodiment of the system of FIG. 1.

Referring now to FIG. 2, the head-up display of FIG. 1 is depicted such that the range of the plan view or non-conformal view has been changed to 2,500 feet. As such, the next turn of the next exit S3 is depicted in the overhead view. Exit S3 is shown by providing exit signs 165 which go across the main runway 196. The exit may be used when the ground speed is below the turn velocity 175. Signs 165 are not actual signs but are placed virtually on the head-up display. Further, triangles 166 are also placed to delineate the boundaries of the turn and are not actual boundaries but show virtual boundaries of the turn.

Figure 3:
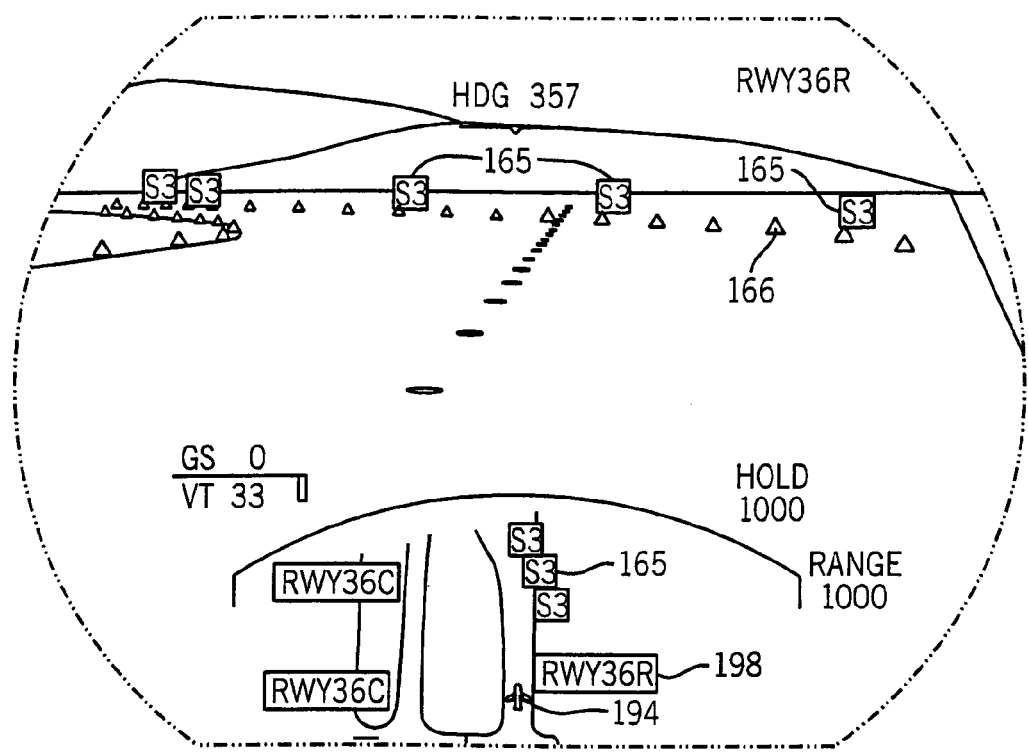
FIG. 3 is another exemplary embodiment of the system of FIG. 1.

Referring now to FIG. 3, aircraft 194 is depicted as approaching the turn S3 and it can be seen that signs 165 are virtual signs that are superimposed on the outside environment. The signs 165 are similar to signs 160 although signs 165 are virtual signs that are also placed based on the location of the aircraft itself from a location determining device.

In accordance with the invention, airport sign symbology provides situational awareness to increase the effectiveness of navigation on the surface by aircraft. All airport signs may be displayed relative to the pilot's eye reference point such that they overlay the outside scene (conformally mapped to the outside scene). The HUD airport signs may accurately represent the real-life location, text and width of the sign, although the text on the sign may be enhanced.

Situational awareness and pilot effectiveness have been further improved by allowing airport signs to be displayed in the non-conformal view of the HUD. In the non-conformal view, airport signs beyond the forward field of view may be displayed. This may be accomplished, at the pilot's discretion, through the use of the ranging function. Accordingly, the range may be changed manually by the pilot, or the range may be changed automatically in certain situations by the computer itself. It should be noted that when the non-conformal view is ranged, the HUD airport sign will continue to accurately depict the location of the real-life signs. Navigation blunders are reduced by allowing the pilot to remain head-up to verify the cleared taxi route with the real-world/HUD sign symbology.

Figure 6:
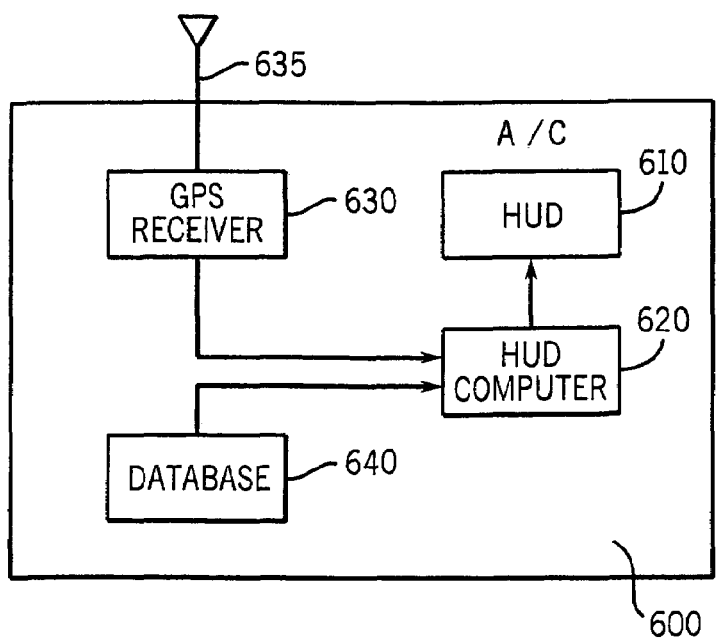
FIG. 6 is an exemplary depiction of a block diagram for an aircraft having a HUD in accordance with the disclosure.

In accordance with an exemplary embodiment, the position and orientation of signs and holds are provided. Referring now to FIG. 6, an aircraft 600 is depicted. Aircraft 600 includes a HUD 610 and a HUD computer 620 coupled therewith. HUD computer 620 receives information from a GPS receiver 630 having a GPS receiver antenna 635. HUD computer 620 receives information from a database 640 which may be requested by HUD computer 620 in accordance with the location detected by GPS receiver 630. HUD computer 620 also receives information from a plurality of other sensors and onboard systems. Further, in certain configurations, HUD computer 620 may also receive information from data links from outside the aircraft such as with an aircraft control tower. In operation, the position orientation of the aircraft are provided by the GPS receiver and other navigational systems and the database provides the surface guidance information such as the location of signs, hold lines, turns, etc., based on the location received by the HUD computer.

In operation of the hold system, the position and orientation of each hold that could be active at a current airport position are obtained from the database. The real time current position (i.e. GPS) will be used to locate the hold and place it at its conformal and/or non-conformal location on the HUD display. In an exemplary embodiment, the air traffic control may be provided with data link information on any hold that may be active. Air traffic control may be able to remotely activate and deactivate any holds at the airport for the particular aircraft. Alert messages and oral warnings may be directed based on data link information that an aircraft is not in the process of obeying a hold from an air traffic control directed command. Alternatively, pilot controls may be provided that allow the pilot to manually activate and deactivate holds (perhaps based on verbal commands from air traffic control).

When the HGS is given a route, the holds that are along the route will be displayed as barrier cones when the hold line is represented as active. These barrier cones will alert the pilot that he needs to hold short of the cones. The barrier cones are similar to taxi path edge cones, but are placed across the taxi path (perpendicular to the center line (e.g. see FIG. 4)). For emphasis, the barrier cones may be shown as larger than edge cones, and may be filled with cross hatching or other emphasis to further emphasize that the aircraft is at the end of a cleared taxi path.

In the non-conformal view, all hold lines may be displayed and represented by their painted position on the airport surface. This representation may be used to insure that an aircraft has not gone beyond any type of hold line the tower may have given them. Further, this symbol may also be used to see when the tail of the aircraft has cleared a painted hold line on the airport surface when exiting a runway.

In the exemplary embodiment provided, airport signs are represented on the combiner as rectangles with text in the center. However, other types of shapes may be used that may be equally as applicable. The rectangle size and text may remain fixed or be scaled accordingly. However, if scaled, the text must remain readable and therefore enhanced. In another exemplary embodiment, it may be possible to use different colors which are conventionally used for airport signs today and presented on the HUD with the color along with the textural information.

Figure 4:
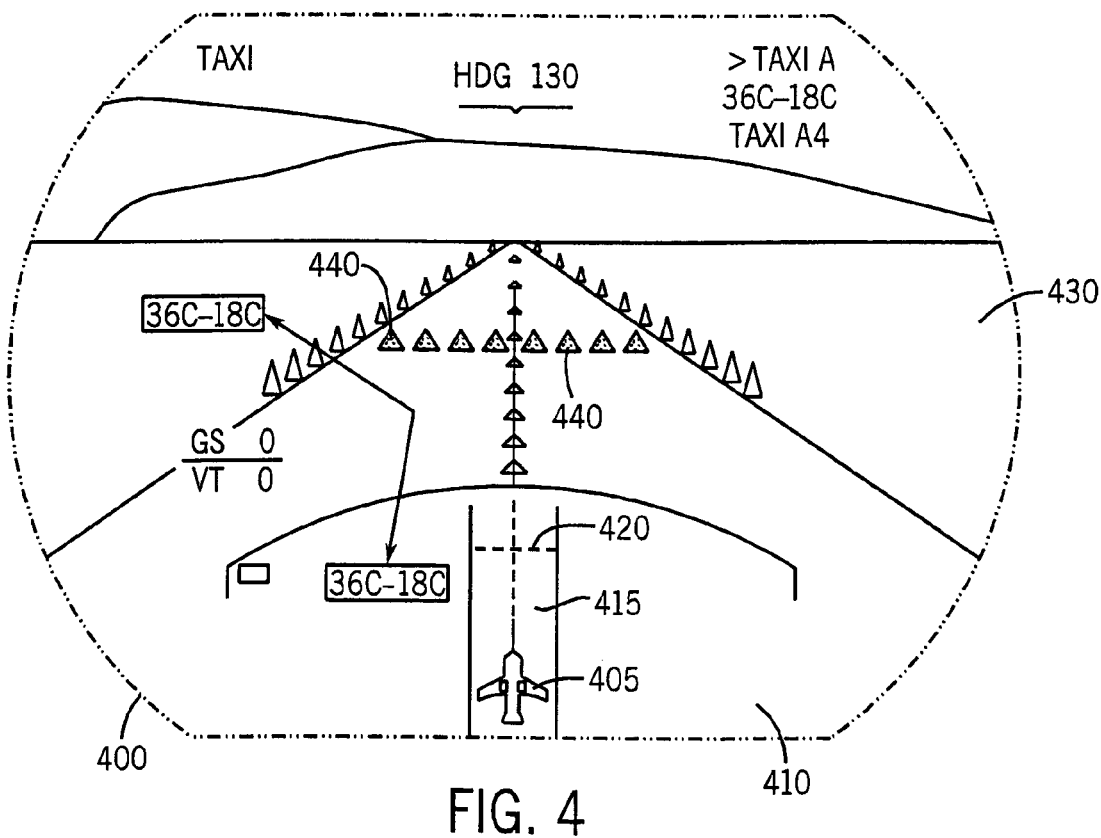
FIG. 4 is an exemplary embodiment of a head-up display for a surface guidance system.

Referring now to FIG. 4, a head-up display 400 is provided showing an aircraft 405 on a plan view 410. Aircraft 405 is depicted on a runway 36C-18C which is runway 415. Runway 415 or taxiway 415 includes a hold line 420. Hold line 420 is shown in the plan display 410. Further, hold line 420, when active (that is when the aircraft is commanded to be held at the hold line), may be provided on the conformal portion of the display 430. The hold line in the conformal display is provided by virtual triangles 440 which overlie the actual hold line on the conformal display. In a particular exemplary embodiment, the hold lines indicators 440 may be turned on or off in accordance with whether the aircraft should hold at that hold line. For example, it may be possible that a co-pilot or other crew member could turn or off the hold lines in response to an aircraft control command. Further, it may be possible that information be streamed directly from the control tower to the aircraft which automatically turns on or off the hold line indicators 440 over a datalink.

Figure 5:
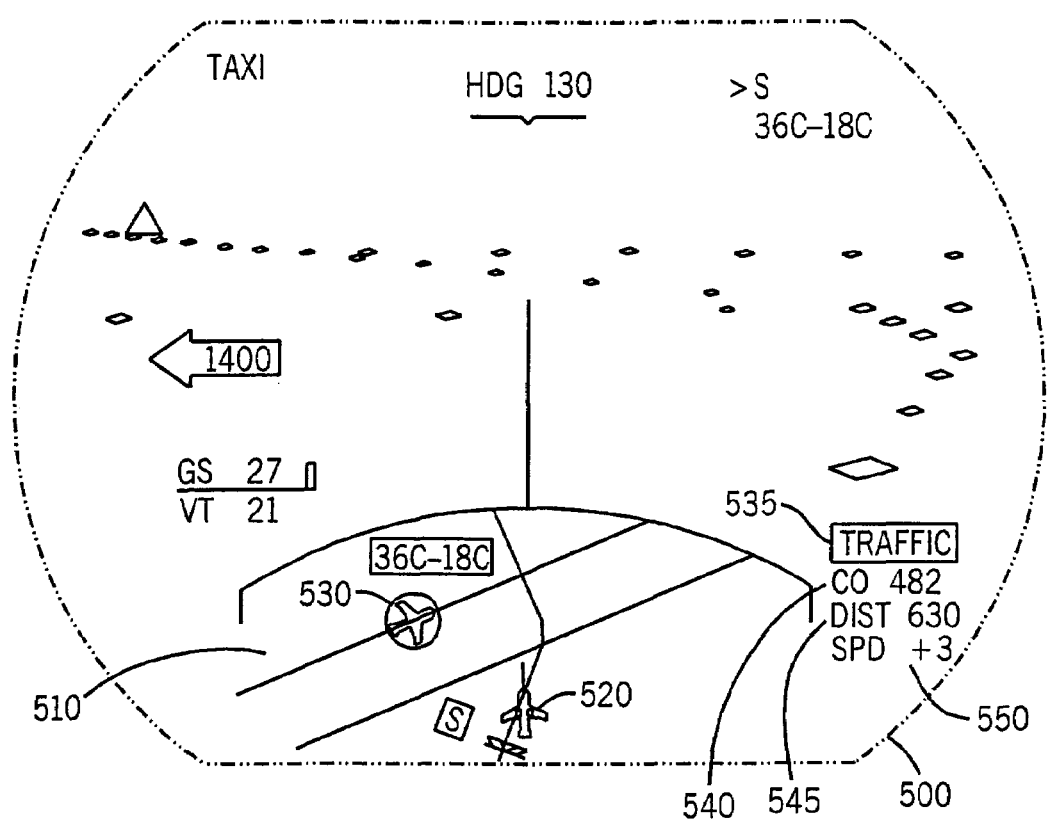
FIG. 5 is another exemplary embodiment of a HUD display for a surface guidance system depicting ADS-B traffic information.

Referring now to FIG. 5, an alternative exemplary head-up display 500 is depicted. Display 500 includes information from an automatic dependent surveillance-broadcast (ADS-B) traffic information system. The display depicted provides a plan view 510 in the display showing the vicinity of aircraft 520. Traffic is identified by an airplane in a circle icon 530. Aircraft 520 may be taxiing along taxiway S moving onto 36C-18C and it may be seen that aircraft 530 may cross the path of 36C-18C. In such an event, the ADS-B system provides alerts to the flight crew that traffic may be a potential problem and traffic advisories or resolution advisories may be provided. First, an indication of traffic is presented on the head-up display 535. The traffic information includes the aircraft call numbers 540, the distance to the vehicle 545 and the speed 550 of aircraft 530 relative to aircraft 520.

In an effort to reduce the number of collisions of aircraft, ADS-B has been developed. In addition to ADS-B flight envelope traffic advisories, surface advisories are now available over the ADS-B systems. In the exemplary embodiment depicted, the HUD may provide traffic advisories (TA) and resolutions advisories (RA) information from a traffic collision avoidance system (TCAS) system in the form of the symbology depicted in FIG. 5. The HUD, however, has not been used to provide the (TCAS) system symbology nor has it been used to provide current traffic symbology to include ADS-B advisories. Accordingly, it is beneficial to provide current traffic advisory symbology on the head-up display to include surface TAs and RAs from the ADS-B. The conformal and non-conformal (plan view) of the HUD may be used to uniquely distinguish between TA and RA traffic.

In the event that the HUD receives an RA warning, the current plan view mode range may be overwritten to a range that allows the display of the RA traffic automatically and an intermediate flashing box 535 saying "TRAFFIC" may be displayed. An example of an RA such as this is provided in FIG. 5. The HUD may also be configured to display TA and RA aircraft information. Such information may include a textual representation of the aircraft flight number, closure rate, and distance. RA and TA traffic information may be displayed in the same area in the head-up display, with RA having priority over TA data. In other words, the RA data will replace the TA data should an RA be required.

While the detailed drawings, specific examples, and particular formulations given described preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the type of computing device, communication bus or processor used may differ. The systems and methods depicted and described are not limited to the precise details and conditions disclosed. Furthermore, other substitutions, modifications, changes, and omissions may be made in the design, operating conditions, and arrangement of the exemplary embodiment without departing from the scope of the invention as expressed in the appended claims.

What is claimed is:

1. A computing device for use in a head-up display system (HUD) on board an aircraft, the HUD includes a projector, a computing device, a combiner, the combiner enabling viewing of the world outside of the combiner, and allowing viewing of information provided from the projector, the computing device comprising:
   a display circuit coupled to the projector for causing the projector to provide airport runway and taxiway symbols conformally mapped onto the combiner, and providing a conformal mapping of virtual airport signs at a position onto the combiner where the position corresponds to an actual location of a sign and a text of the sign is reproduced to allow the text of the sign to be readable;
   a non-conformal region of the combiner for receiving non-conformal information; and
   wherein the display circuit is configured to provide a hold line icon on the combiner.

2. The computing device of claim 1, wherein an aircraft location signal is received from a location determining device.

3. The computing device of claim 1, wherein an actual location of a sign signal is received from a database.

4. The computing device of claim 1, wherein an aircraft location signal is received from a global positioning system.

5. The computing device of claim 1, wherein the display circuit transmits
   a line of text information positioned at approximately the same location on the virtual airport signs as on the sign, each line of text information being the same as information on the sign.

6. The computing device of claim 1, wherein the non-conformal region of the combiner provides a plan form mapping of at least a portion of the airport.

7. The computing device of claim 1, wherein the non-conformal region of the combiner provides representations of airport signs.

8. A method of providing a virtual airport sign on an aircraft combiner for a head-up display (HUD), comprising:
   determining a location of an aircraft;

retrieving information from a database relating to a location of an airport feature within a predetermined distance of the aircraft, the airport feature comprising a locations of a sign;

conformally mapping the virtual airport sign at a position onto the aircraft combiner of the HUD where the position corresponds to an actual location of the sign displaying a text of the sign onto the aircraft combiner to allow the text of the sign to be readable; and wherein the predetermined distance can be varied.

9. The method of claim 8, further comprising:

dividing the combiner into a conformal region and a non-conformal region.

10. The method of claim 9, further comprising:

providing a plan form map including airport signs on the non-conformal display region.

11. The method of claim 8, wherein the location of the aircraft is determined using a global positioning system (GPS) receiver.

12. The method of claim 8, further comprising:

generating a virtual turn sign for indicating a location of a turn.

13. A system for projecting a virtual airport sign on a combiner of a head-up display (HUD), comprising:

a means for determining a location of an aircraft;

a means for retrieving geolocated information from a database relating to a location of an airport feature within a predetermined distance of the aircraft, the airport feature comprising a location of an airport sign;

a means for conformally mapping the virtual airport sign at a position onto the combiner of the HUD where the position corresponds to an actual location of the airport sign;

a means for displaying a text of the sign onto the combiner to allow the text of the sign to be readable; and wherein the predetermined distance can be varied.

14. The system of claim 13, further comprising:

a means for dividing the combiner into a conformal region and a non-conformal region.

15. The system of claim 14, further comprising:

a means for providing a plan form map including airport signs on the non-conformal display region.

16. The system of claim 13, wherein the location of the aircraft is determined using a global positioning system (GPS) receiver.

17. The method of claim 13, further comprising:

a means for generating a virtual turn sign for indicating a location of a turn.

18. The computing device of claim 1, wherein the text of the sign is reproduced to allow the text of the sign to be readable at any real-life distance from the aircraft.

19. The computing device of claim 1, wherein the display circuit is configured to provide a virtual turn signal based on a comparison of an aircraft ground speed to a turn velocity.

* * * * *